United States Patent
Middour et al.

(10) Patent No.: US 7,952,523 B2
(45) Date of Patent: May 31, 2011

(54) METHOD AND APPARATUS FOR PASSIVELY LOCATING RADAR EMISSIONS FROM ROTATING TRANSMITTERS

(75) Inventors: Jay W Middour, Alexandria, VA (US); Kelia Bynum, Springfield, VA (US); Christopher Huffine, Alexandria, VA (US); Anthony D'Agostino, Arlington, VA (US); Charles Chrisman, Fairfax, VA (US); C Lane Ellis, Alexandria, VA (US); Randolph L. Nichols, Woodbridge, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/481,052

(22) Filed: Jun. 9, 2009

(65) Prior Publication Data
US 2010/0309055 A1     Dec. 9, 2010

(51) Int. Cl.
*G01S 1/44* (2006.01)
*G01S 1/24* (2006.01)
(52) U.S. Cl. .................... 342/465; 342/387; 342/463
(58) Field of Classification Search .............. 342/387, 342/463, 465
See application file for complete search history.

(56) References Cited

U.S. PATENT DOCUMENTS

| 5,179,573 | A  | * | 1/1993 | Paradise ................... 375/150 |
| 5,890,068 | A  | * | 3/1999 | Fattouche et al. .......... 455/456.2 |
| 7,307,915 | B2 |   | 12/2007 | Kimball |
| 2007/0247368 | A1 | * | 10/2007 | Wu ............................. 342/465 |
| 2009/0303130 | A1 | * | 12/2009 | Kanterakis .................. 342/387 |

OTHER PUBLICATIONS

Vibrometric, VIBSIST-20 Swept Impact Source for small to medium range surface high-resolution seismic surveys (2009).*
Vibrometric, VIBSIST-20 Swept Impact Source for small to medium range surface high-resolution seismic surveys.
Park, C. B., Miller, R. D., Steeples, D. W. & Black, R. A., "Swept impact seismic technique (SIST)", Geopysics, vol. 61, No. 6 (Nov.-Dec. 1996); p. 1789-1803, 13 Figs.

* cited by examiner

*Primary Examiner* — Thomas H Tarcza
*Assistant Examiner* — Cassi Galt
(74) *Attorney, Agent, or Firm* — Amy Ressing; Suresh Koshy

(57) ABSTRACT

Systems and methods are presented for passive location of transmitters in which two or more receivers time stamp received signals from target transmitters and the time stamped data for each target signal of interest is isolated to identify a peak power time of arrival for the signal at each transmitter from which differential scan observation values are derived, and for each signal of interest a line of position curve is computed based on the differential scan observation value and corresponding receiver locations, and for each signal of interest an estimated target transmitter location is determined based on an intersection of two corresponding line of position curves.

20 Claims, 5 Drawing Sheets

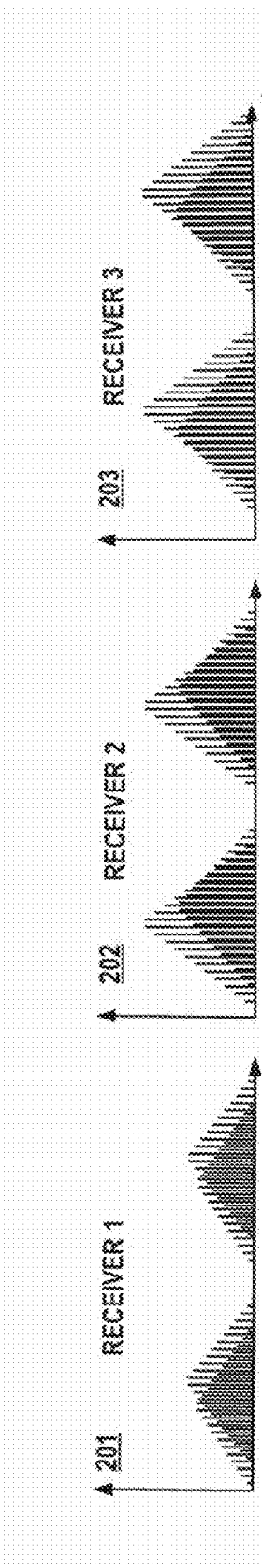
FIG. 4A  
FIG. 4B  
FIG. 4C
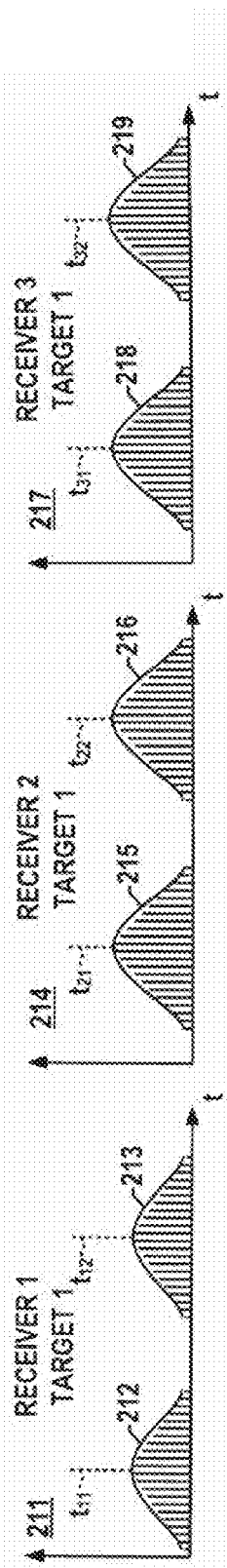
FIG. 5A  
FIG. 5B  
FIG. 5C
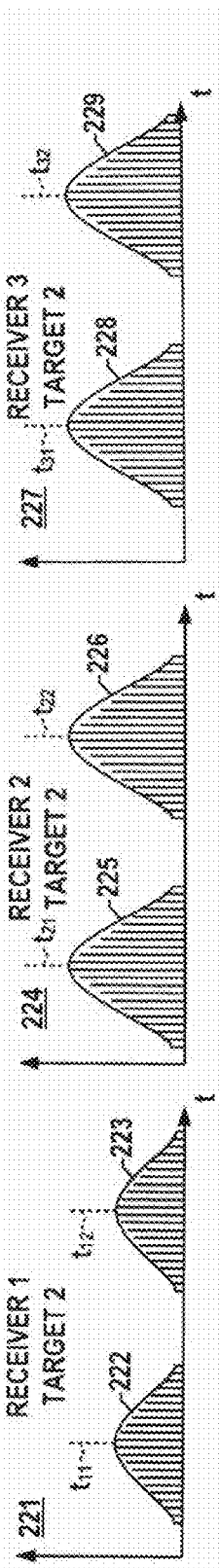
FIG. 6A  
FIG. 6B  
FIG. 6C

METHOD AND APPARATUS FOR PASSIVELY LOCATING RADAR EMISSIONS FROM ROTATING TRANSMITTERS

FIELD OF THE DISCLOSURE

The present disclosure relates generally to locating the sources of radar transmissions and more particularly to methods and apparatus for passively locating radar emissions from transmitters.

BACKGROUND

A variety of applications exist for precisely locating the source or radio waves such as radar transmitters. Conventional location techniques employ signal arrival time-difference and phase-difference at spatially separated low gain or so-called main beam receivers and require simultaneous illumination of the receivers by the target radar signal. However, the receivers must have sufficiently small angular separation relative to the radar to achieve simultaneous illumination, which is not always practical. In addition, the geometric dilution of precision increases as the separation of the receivers decreases. Thus, there remains a need for improved techniques and apparatus for detecting the source of radar and other radio wave transmission.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. Systems and methods are presented hereinafter for passive location of radar transmitters which do not require simultaneous illumination of the receivers as was the case in conventional techniques. The system includes fixed or moving receivers that receive and time stamp signals from one or more target transmitters and a central processing facility with a processor and a memory storing differential scan observation values derived from peak power time of arrival data from a pair of the receivers for each signal of interest. For each signal of interest, the processor computes a line of position curve based on the differential scan observation value and corresponding receiver locations, and determines an estimated target transmitter location based on an intersection of two corresponding line of position curves for each signal of interest.

The receivers and/or the central processing facility in certain embodiments identify peak power time of arrival values for each signal of interest and each receiver, and merge peak power time of arrival data from multiple receivers for each signal of interest, where the central processing facility computes a differential scan observation value for each pair of receivers with peak power time of arrival data for the signal of interest. The central processing facility in one embodiment solves an equation for each differential scan observation value to compute the line of position curves, and may linearize the equation about an a priori location estimate and iteratively update the location estimate so as to minimize a root mean square (RMS) of the difference between actual and modeled differential scan observations. In certain embodiments, moreover, the central processing facility curve-fits received and time stamped signals using a second-order polynomial to identify the peak power arrival time at a maximum value of the fitted curve. In certain embodiments, three or more stationary receivers are used, and the location estimate is determined from the intersection of two or more line of position curves computed from two or more differential scan observation values. In other implementations, two or more receivers are used, with at least one receiver moving, where two differential scan observation values and corresponding line of position curves are computed to determine the estimated transmitter location.

Passive radar transmitter location methods are provided, which include receiving and time stamping signals from one or more target transmitters at each of a plurality of receivers, isolating amplitude and time data for each signal of interest and identifying a peak power time of arrival for each signal of interest for each receiver, as well as merging peak power time of arrival data from multiple receivers for each signal of interest. The methods further include computing a differential scan observation value for each pair of receivers with peak power time of arrival data and computing a line of position curve for each differential scan observation value based on the differential scan observation value and corresponding receiver locations for each signal of interest. In addition, the methods include determining an estimated target transmitter location based on an intersection of two corresponding line of position curves for each signal of interest. The line of position computation in certain embodiments includes solving an equation for each differential scan observation value and linearizing the equation about an a priori location estimate and iteratively updating the location estimate so as to minimize a root mean square of the difference between actual and modeled differential scan observations. The identification of the peak power time of arrival in some implementations includes curve-fitting the received and time stamped signals using a second-order polynomial and identifying a time value corresponding to a maximum value of the fitted curve.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIGS. 4A-4C are graphs illustrating received signals from two target transmitters at three exemplary receivers in the system of FIG. 1;

FIGS. 5A-5C are graphs illustrating isolation of a signal of interest corresponding to a first target transmitter and curve fitting to identify a time of peak power arrival at the three exemplary receivers in the system of FIG. 1;

FIGS. 6A-6C are graphs illustrating isolation of another signal of interest corresponding to a second target transmitter and curve fitting to identify a time of peak power arrival at the three exemplary receivers in the system of FIG. 1;

DETAILED DESCRIPTION OF THE DISCLOSURE

Figure 1:
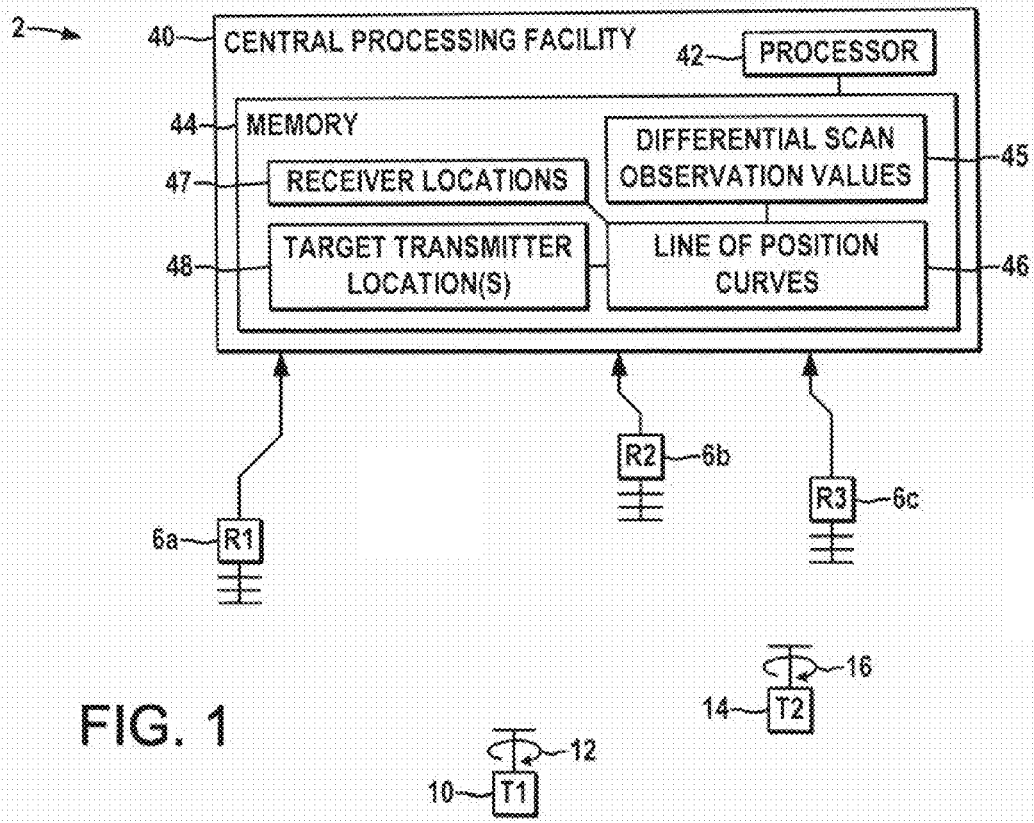
FIG. 1 is a schematic system level diagram illustrating an exemplary system for locating a radar transmitter having three stationary receivers in accordance with one or more aspects of the present disclosure.
Figure 2:
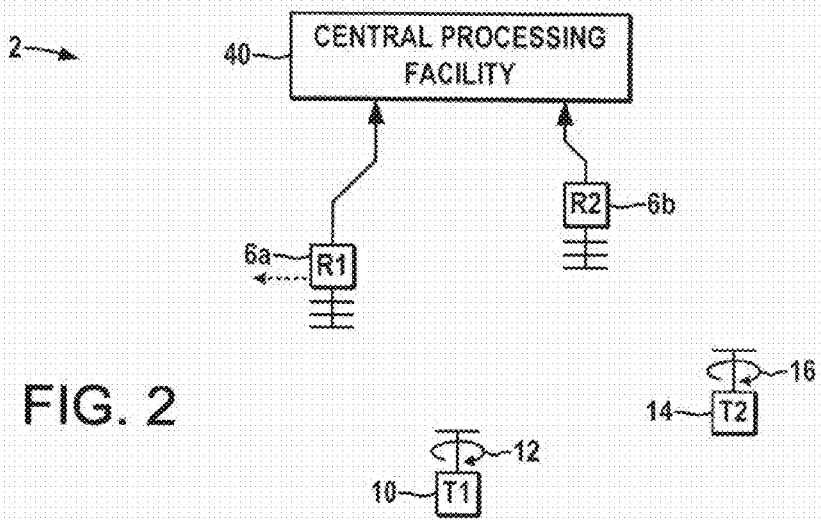
FIG. 2 is a schematic system level diagram illustrating another implementation of a system for locating a radar transmitter having two receivers, one of which is moving, in accordance with one or more aspects of the present disclosure.

Referring to the figures, several embodiments or implementations are hereinafter described in conjunction with the drawings, where like reference numerals are used to refer to like elements throughout, and where the various features are not necessarily drawn to scale. Referring initially to FIGS. 1 and 2, an exemplary system 2 is illustrated for locating a radar transmitter 10, 14. The system 2 includes a plurality of receivers 6 which operate to receive and time stamp signals from one or more target transmitters 10, 14, as well as a central processing facility 40 which is coupled with the receivers 6. The central processing facility 40 includes a processor 42 and a memory 44, and may include any form of hardware, software, firmware, programmable logic, etc. or combinations thereof in order to implement the functions described herein and may be implemented as a unitary facility or may implement one or more of the disclosed features in distributed fashion using two or more processors 42 operatively coupled by wired and/or wireless networks or other communications apparatus. The memory 44 may be used to store program code executed by the processor 42 as well as data, and the memory 44 may be a unitary memory component or may include multiple memory elements. In the illustrated embodiment, the memory 44 stores differential scan observation values 45 derived from peak power time of arrival data associated with pairs of the receivers 6 for each signal of interest, where a signal of interest is a signal determined or assumed to be sourced by a particular target transmitter 4, 10 of interest. In operation, the processor 42 computes a line of position curve 46 (FIGS. 7-10 below) for each differential scan observation value for each signal of interest, based on the differential scan observation value 45 and the locations 47 of the corresponding receivers 6, which are also stored in the memory 44 in the illustrated implementation. In addition, the processor 42 determines an estimated target transmitter location 48 for each signal of interest based on the intersection 48 of two corresponding line of position curves 46 (FIGS. 7-10).

Figure 7:
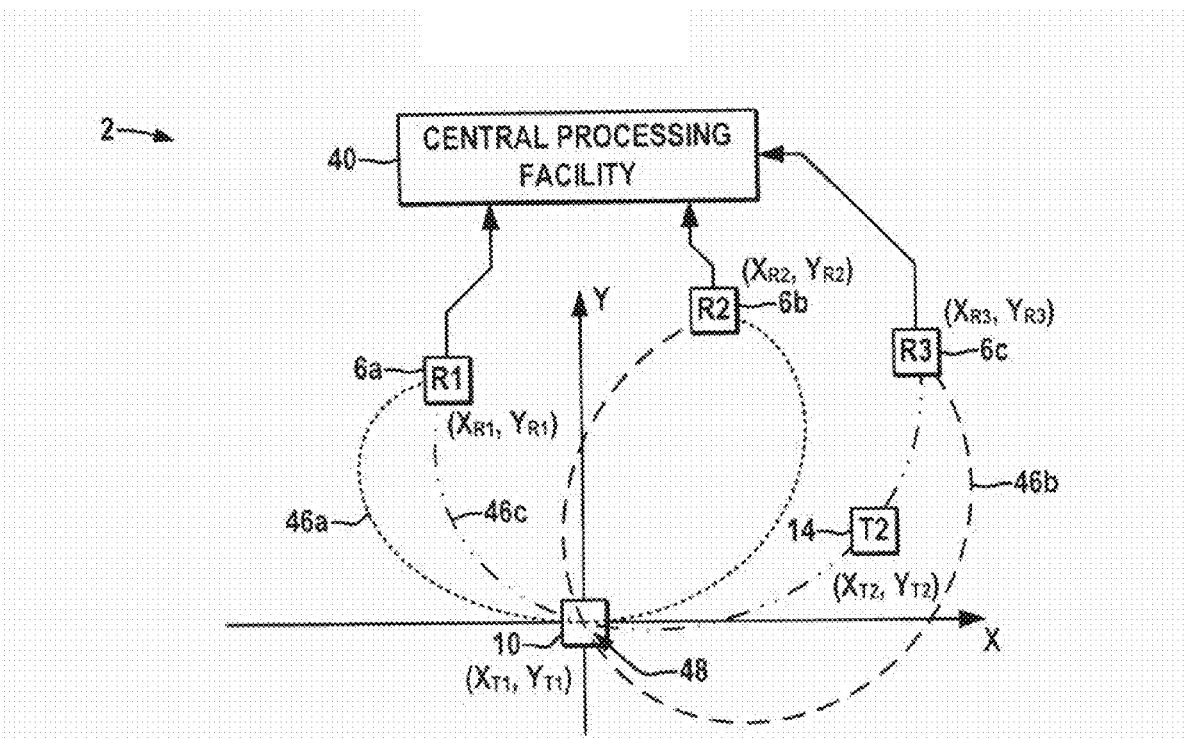
FIG. 7 is a schematic diagram illustrating three exemplary line of position curves computed in the system of FIG. 1 from differential scan observation values for pairs of the receivers with respect to a first target transmitter located proximate the intersection of the line of position curves.
Figure 8:
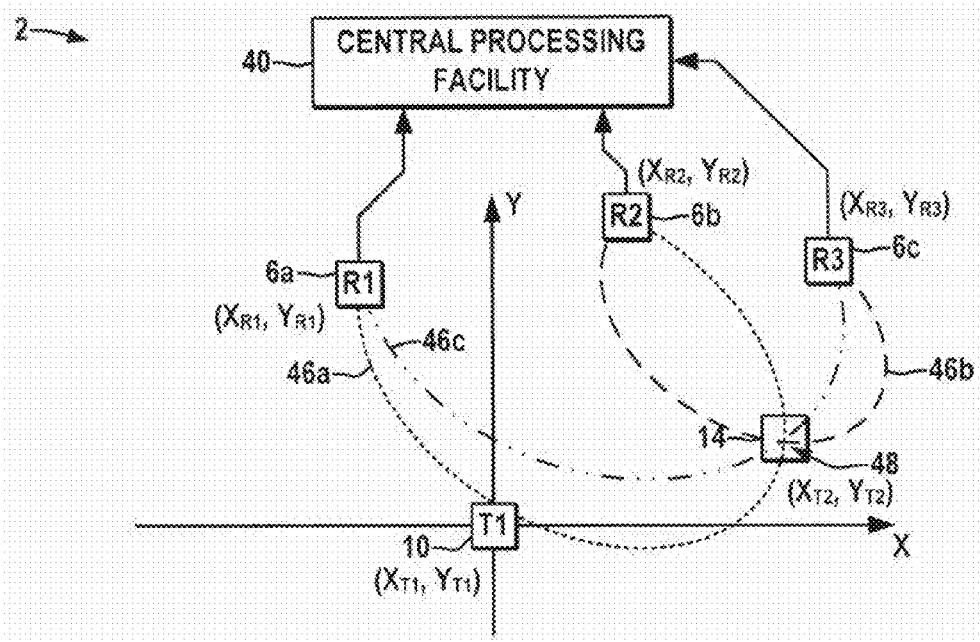
FIG. 8 is a schematic diagram illustrating another set of three line of position curves computed in the system of FIG. 1 using differential scan observation values for pairs of the receivers with respect to a second target transmitter located proximate the intersection of the line of position curves.

As best shown in FIG. 1, one implementation of the system 2 includes three or more stationary receivers (e.g., receivers 6a, 6b, and 6c in FIG. 1), in which case two differential scan observation values 45 can be computed for each signal of interest for at least two corresponding pairs of the receivers 6. In this implementation, the central processing facility 40 computes at least two corresponding line of position curves 46 for each signal of interest using the two differential scan observation values 45 (e.g., as shown in FIGS. 7 and 8 below), and determines the target transmitter location estimate for each signal of interest based on the intersection of the two line of position curves 46. Another implementation is depicted in FIG. 2 with two or more receivers (e.g., receivers 6a and 6b) in which at least one receiver 6a is moving. In this case, two differential scan observation values 45 may be computed by the facility 40 for each signal of interest for the receivers 6a and 6b and at least two corresponding line of position curves 46 are computed (e.g., FIGS. 9 and 10 below) for each signal of interest using the two differential scan observation values 45 and the corresponding receiver positions 47, where the target transmitter location is estimated for each signal of interest based on the intersection of the two line of position curves 46.

In the illustrated system 2, the receivers 6 receive signals emitted by the target transmitters, such as radar or other radio waves, and quantify the received signal strength and the time of signal receipt, such as by time stamping. Referring also to FIGS. 4A-4C, graphs 201-203 illustrate received signals from two target transmitters T1 (10) and T2 (14) at the three exemplary receivers 6a-6c, respectively, in the system 2 of FIG. 1. In operation, the transmitter 10 (T1) generates a rotating radar signal operated at a rotational speed (frequency) $\omega_1$ in the direction 12 shown in FIGS. 1 and 2, and the second illustrated transmitter 14 (T2) likewise transmits a rotating radar signal at a rotational speed $\omega_2$ in the direction 16, where the target transmitters 10, 14 may operate at different rotational frequencies $\omega$ and at different transmit power levels, and need not be in phase with one another. The receivers 6, moreover, may be any suitable form of receiver operative to receive radio wave signals from the target transmitters 10, 14, and may include various hardware, software, communications interfaces, and other circuitry to send signals and data to the central processing facility 40.

The received signal power levels and arrival time (time stamp) information may be forwarded to the central processing facility 40 and/or the receivers 6 may perform one or more signal processing/analysis tasks prior to forwarding data to the central facility 40. In particular, the central processing facility 40 or the receivers 6 are configured to identify a peak power time of arrival value for each signal of interest and each receiver. As further shown in graphs 211, 214, and 217 in FIGS. 5A-5C, this may involve segregating received (and time stamped) signals associated with a particular target transmitter of interest, collectively referred to as a signal of interest. For example, as the transmitters 10 and 14 in FIG. 1 generate rotating radar transmissions, these are received at the three exemplary receivers 6a, 6b, and 6c, where received signals are shown in FIGS. 4A-4C as a function of time. These raw received and time stamped signal values are a composite of signals generated by the two transmitters 10 and 14, and can be separated into identified signals of interest by the receivers 6 and/or by the central processing facility 40 as shown in FIGS. 5A-5C (corresponding to first signals of interest from the first transmitter 10 (T1)) and in FIGS. 6A-6C (corresponding to second signals of interest from the second transmitter 14 (T2)), respectively.

Referring to FIGS. 5A-5C, the graph 211 in FIG. 5A shows signals received from the first transmitter 10 at the first receiver 6a in FIG. 1. As shown in this figure, moreover, either the receiver 6a or the central processing facility 40 is operative to identify peak power time of arrival values $t_{11}$ and $t_{12}$ for this signal of interest, in one embodiment, by curve-fitting the received and time stamped signals using a second-order polynomial and identifying time values $t_{11}$ and $t_{12}$ corresponding to maximum values of the fitted curves 212 and 213. In this case, the first curve 212 is fit to signals received in one sweep of the transmitter 10's rotation, where the time $t_{11}$ is the derived time that the first receiver 6a receives the peak transmitter power during this first sweep of the first transmitter 10. FIG. 5A further illustrates subsequently received signals by the first receiver 6a from a second sweep of the first transmitter 10, which is curve fit via a second-order polynomial curve 213, and from which a corresponding peak power time of arrival value $t_{12}$ is ascertained. With respect to signals from the first and second sweeps of the first transmitter, FIG. 5B shows graph 214 for the second exemplary receiver 6b with fitted curves 215 and 216 and corresponding peak power time of arrival values $t_{21}$ and $t_{22}$, and the graph 217 in FIG. 5C illustrates segregated data fitted with curves 218 and 219 and corresponding peak power time of arrival values $t_{31}$ and $t_{32}$ for the third receiver 6c of FIG. 1.

FIGS. 6A-6C similarly show segregated signals received from the second transmitter 14 by the three exemplary receivers 6a-6c in graphs 221, 224, and 227, respectively. For first and second sweeps of the second transmitter 14, the graph 221 for the first receiver 6a shows fitted curves 222 and 223 and corresponding peak power time of arrival values $t_{11}$ and $t_{12}$. For the second receiver 6b, graph 224 in FIG. 6B illustrates fitted curves 225 and 226 and corresponding peak power time of arrival values $t_{21}$ and $t_{22}$, and the graph 227 in FIG. 6C shows fitted curves 228 and 229 and corresponding peak power time of arrival values $t_{31}$ and $t_{32}$ for the third receiver 6c. These aspects of the data reception, segregation of signals of interest, and curve fitting can be extended to any number of receivers and any number of target transmitters, where any suitable techniques may be used for identifying received signals of interest associated with a given target transmitter source, even if the number of target transmitters is unknown using one or more known signal processing techniques for signal segregation.

In operation, the central processing facility 40 merges the peak power time of arrival data from multiple receivers 6 and uses these compute a differential scan observation value 45 for each pair of receivers 6 with peak power time of arrival data for each signal of interest. In the illustrated embodiments, the differential scan observation values 45 are computed as the difference between corresponding peak power time of arrival values from pairs of receivers 6, for example, $t_b - t_a$ computed as the difference between peak power time of arrival values for two receivers a and b.

In one embodiment, moreover, the central processing facility 40 solves the following equation (1) for each differential scan observation value 45 to compute a line of position curve 46:

$$t_b - t_a = \frac{1}{\omega} \cos^{-1}\left(\frac{(r_a - r)(r_b - r)}{|r_a - r||r_b - r|}\right), \quad (1)$$

where $t_b - t_a$ is the differential scan observation value 45, $\omega$ is the transmitter scanning frequency in radians per second, $r_a$ is a multi-dimensional vector location of receiver a, $r_b$ is a multi-dimensional vector location of receiver b, and r is the line of position curve 46.

To improve the estimate of the target location, moreover, the central processing facility 40 in certain embodiments linearizes the equation (1) about an a priori location estimate and iteratively updates the estimated location so as to minimize a root mean square (RMS) of the difference between actual and modeled differential scan observations 45. Least squares data fitting (weighted least squares differential correction) may thus be used to identify a model estimated location for which the sum of squared residuals is minimal, where the residuals are computed as the difference between an observed value and the value given by the model.

Figure 3:
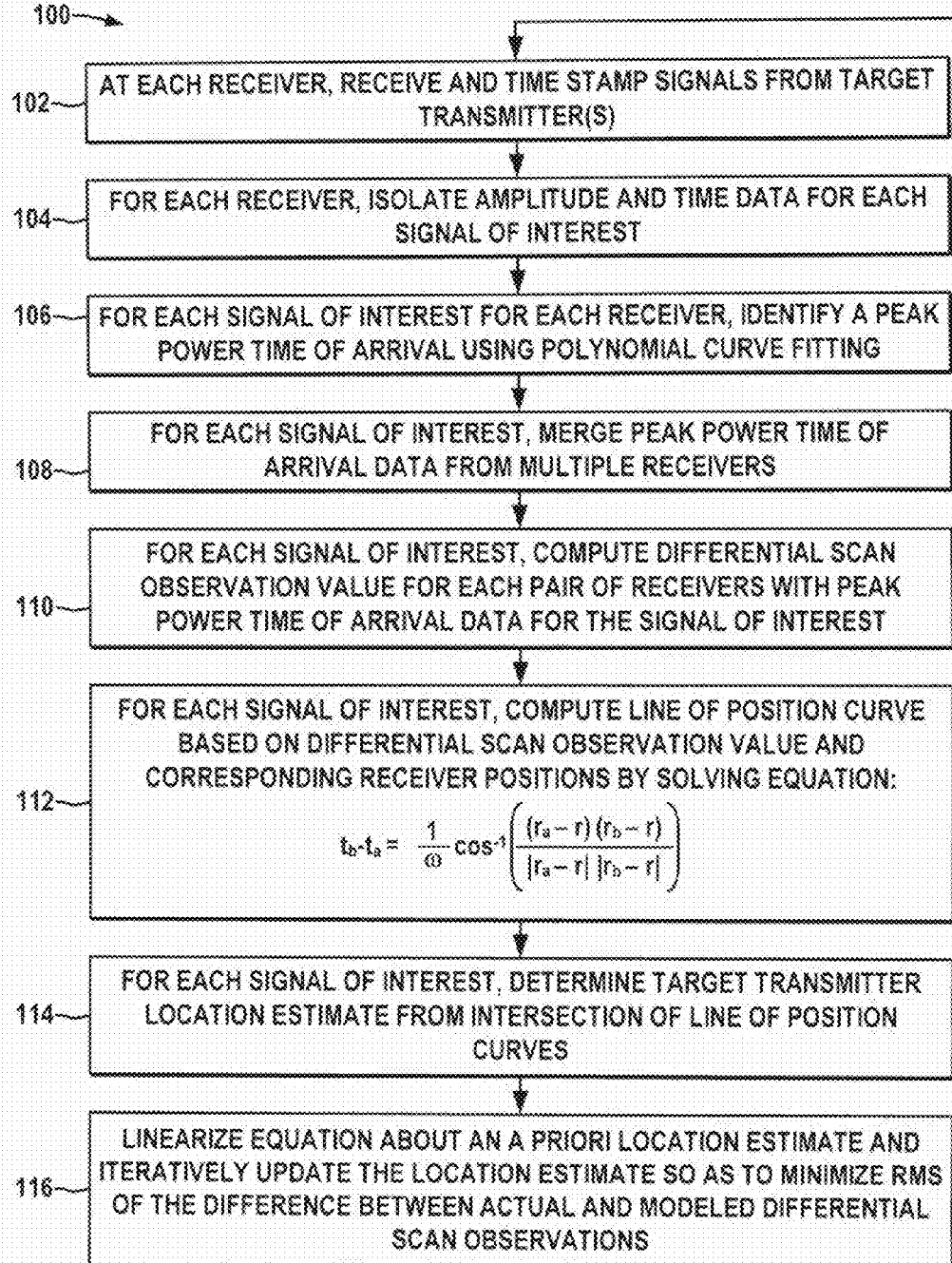
FIG. 3 is a flow diagram illustrating an exemplary method for passive location of a radar transmitter in accordance with further aspects of the disclosure.

FIG. 3 illustrates an exemplary method 100 for passive location of a radar transmitter in accordance with further aspects of the disclosure, and is hereinafter described in connection with the exemplary system 2 of FIGS. 1 and 2 above. While the method 100 is illustrated and described below as a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 and other methods of the disclosure may be implemented in hardware, software, or combinations thereof, such as in the exemplary processor-based system 2 described above, and may be embodied in the form of computer executable instructions stored in a physical computer readable medium, such as in the memory 44 operatively associated with the system 2 in one example.

The method 100 begins at 102 with receipt and time stamping of signals received at the plurality of receivers 6 from one or more target transmitters 10, 14. For each receiver 6, amplitude (e.g., power) and time data are isolated at 104 for each signal of interest. For each signal of interest and for each receiver 6, a peak power time of arrival is identified at 106, such as by curve-fitting the received and time stamped signals using a second-order polynomial and identifying a time value corresponding to a maximum value of the fitted curve (e.g., as illustrated and described above in connection with FIGS. 5A-5C and 6A-6C). As noted above, this processing at 104 and 106 may be done in the receivers 6 and/or at the central processing facility 40 in the exemplary system 2. At 108, peak power time of arrival data from multiple receivers 6 is merged for each signal of interest, and a differential scan observation value 45 is computed at 110 for each pair of receivers 6 with peak power time of arrival data for each signal of interest. In this regard, some receivers may not have received data for a given target transmitter and data is used where received. At 112, for each signal of interest, a line of position curve 46 is computed for each differential scan observation value based on the differential scan observation value 45 and corresponding receiver locations 47, and for each signal of interest, an estimated target transmitter location is determined at 114 based on an intersection 48 of two corresponding line of position curves 46. In one embodiment, the computation of the line of position curves 46 at 112 includes solving the above equation (I) for each differential scan observation value 45. The exemplary method 100, moreover, includes optionally linearizing the equation at 116 about an a priori location estimate and iteratively updating the location estimate so as to minimize a root mean square of the difference between actual and modeled differential scan observations 45, although not a strict requirement of the broader aspects of the present disclosure.

FIG. 7 schematically illustrates the system 2 in operation to ascertain a location of the exemplary first transmitter 10 (T1) in a situation in which three stationary receivers 6a-6c are used (see also FIGS. 4A-4C and 5A-5C). In this example, the receivers 6a-6c have each received signals from one rotating pass of the transmitter 10 and have time stamped the received power values. As each receiver 6a-6c also received signals from the second transmitter 14, the receivers 6 (or the central processing facility 40) the received signals are segregated for the two target transmitters and that associated with the first transmitter 10 is curve-fitted to ascertain the peak arrival time and these are merged and used to compute differential scan observation values for the three receiver pairs R1-R2 (6a, 6b), R2-R3 (6b, 6c) and R3-R1 (6c, 6a), as depicted in the curve fitted data 212, 215, and 218 in FIGS. 5A-5C, respectively. The central processing facility 40 solves the above equation (1) to generate three corresponding line of position curves 46a, 46b, and 46c as shown in FIG. 7, which intersect at (or around) an intersection 48, which is then used as the estimated location of the target transmitter 10. Another round of signal reception and processing can be done using signals received from a second rotation of the first transmitter 10 (e.g., fitted curves 213, 216, and 219 in FIGS. 5A-5C), resulting in generation of another set of three line of position curves 46 and intersections thereof, with the transmitter position estimate being updated accordingly.

FIG. 8 shows analogous data acquisition and processing for the three exemplary receivers 6a-6c in FIG. 1 with respect to signals received from a first rotation of the second transmitter 14. In this example, the receivers 6a-6c each receive and time stamp the received signals, and those related to the second target transmitter 14 are isolated and curve-fitted to determine the peak arrival time values (e.g., first curves 222, 225, and 228 and associated peak arrival times $t_{11}$, $t_{21}$, and $t_{31}$ in FIGS. 6A-6C, respectively). The peak arrival times $t_{11}$, $t_{21}$, and $t_{31}$ are used to compute differential scan observation values 45 for the three receiver pairs R1-R2 (6a; 6b), R2-R3 (6b, 6c) and R3-R1 (6c, 6a), and the central processing facility 40 solves equation (1) to compute three corresponding line of position curves 46a, 46b, and 46c shown in FIG. 8, which intersect at (or around) an intersection 48, which is then used as the estimated location of the second transmitter 14, and further iterations of signal reception and processing can be implemented from another rotation of the transmitter 14 (e.g., curves 223, 226, and 229 in FIGS. 6A-6C), to generate another set of three line of position curves 46 and intersection 48 thereof to update or refine the estimated transmitter location.

Figure 9:
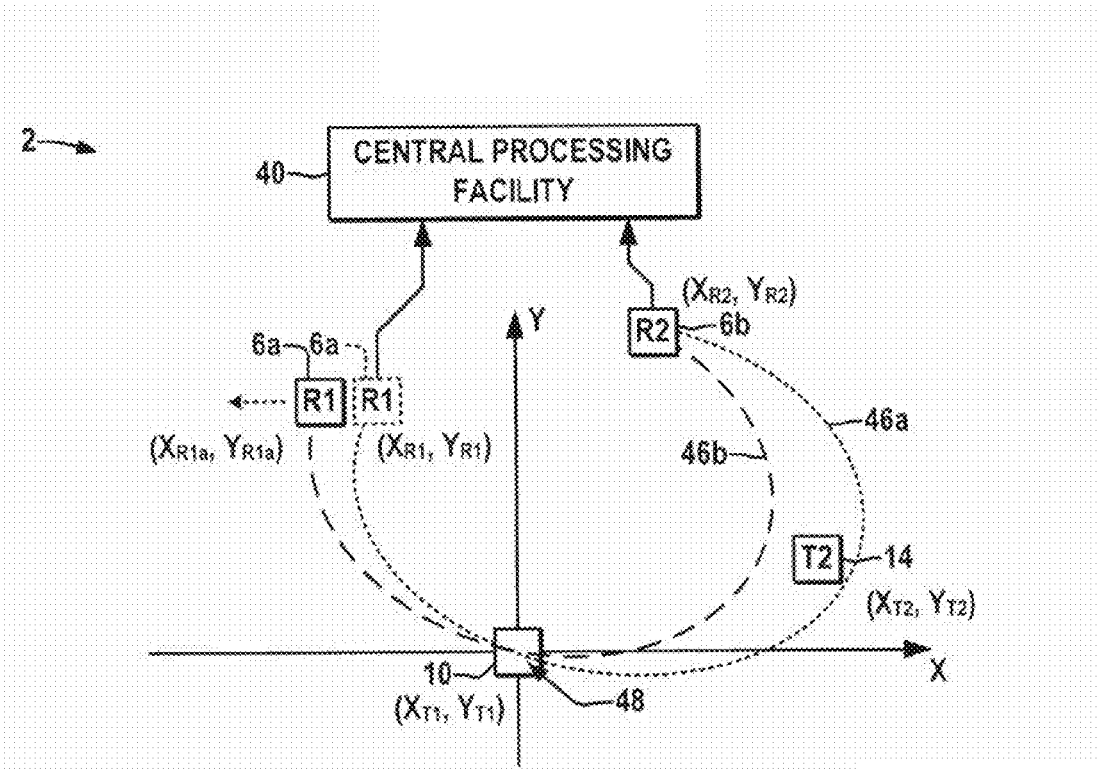
FIG. 9 is a schematic diagram illustrating two exemplary line of position curves computed in the system of FIG. 2 using differential scan observation values for a pair receivers with one receiver moving with respect to the first target transmitter located proximate the intersection of the line of position curves.
Figure 10:
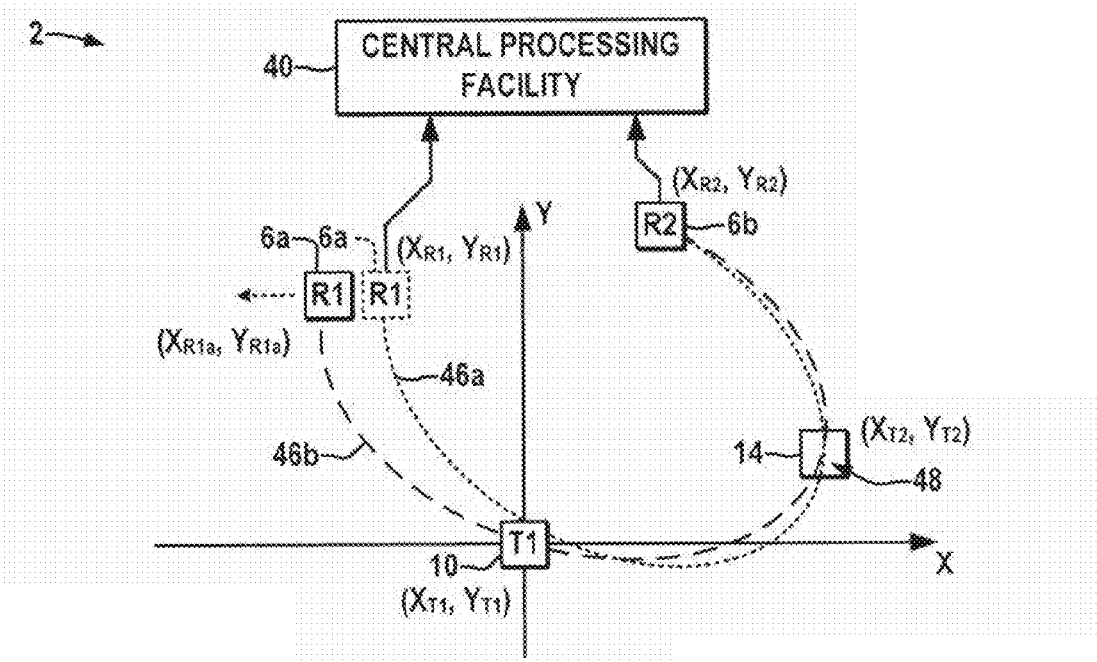
FIG. 10 is a schematic diagram illustrating two line of position curves computed using differential scan observation values for a pair receivers with one receiver moving with respect to the second target transmitter in the system of FIG. 2.

FIGS. 9 and 10 illustrate another implementation, in which as few as two receivers R1 and R2 (6a and 6b, see also FIG. 2 above) are used, with at least one of the receivers (e.g., receiver 6a in the illustrated example) moving. Using the signal reception and processing techniques described above, the central processing facility 40 derives two exemplary line of position curves 46a and 46b shown in FIG. 9 with respect to the location of the first transmitter of interest 10 using received and time stamped signal data obtained by the receivers 6a and 6b in two different rotational cycles of the target transmitter 10. In the interim period between these target transmitter rotations, the receiver 6a has moved from an initial position (shown in dashed lines in FIG. 9) at the time of the first transmitter cycle, to a second position during the second transmitter rotation (shown in solid line in FIG. 9). Assuming for illustrative purposes that the target transmitter 14 has not moved or is only moving slowly relative to the transmitter rotational frequency ω, the peak power time of arrival value for the first receiver 6a will be different for the first and second scans, whereas that of the second (stationary) receiver 6b will be the same. Thus, for example, the first and second curve-fitted peak power time of arrival values $t_{11}$ and $t_{12}$ (FIG. 5A above) will differ from one another by an amount that depends on the movement of the first receiver 6a, whereas the difference between the arrival values $t_{21}$ and $t_{22}$ in FIG. 5B. As a result, the computed differential scan values $t_{21}-t_{11}$ and $t_{22}-t_{12}$ will be different and the corresponding line of position curves 46a and 46b will be different as shown in FIG. 9. In this manner, the intersection 48 of the two curves 46a and 46b is used as the estimated transmitter location, and is obtained using only two receivers 6a and 6b. The same is true for locating the second target transmitter 14 at the intersection of corresponding first and second line of position curves 46a and 46b in FIG. 10, where the relative movement of at least one receiver (6a) and the central processing facility's tracking of the receiver locations 47 allows the solution of the above equation to generate two intersecting curves 46a and 46b for each signal of interest and thus to allow estimation of the location of a target transmitter 14 of interest using as few as two receivers.

The above examples are merely illustrative of several possible embodiments of various aspects of the present disclosure, where equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for passive location of a radar transmitter, the method comprising:
   at each of a plurality of receivers, receiving and time stamping signals from one or more target transmitters;
   for each receiver, isolating amplitude and time data for each signal of interest;
   for each signal of interest for each receiver, identifying a peak power time of arrival;
   for each signal of interest, merging peak power time of arrival data from multiple receivers:
   for each signal of interest, computing a differential scan observation value for each pair of receivers with peak power time of arrival data for the signal of interest;
   for each signal of interest, computing a line of position curve for each differential scan observation value based on the differential scan observation value and corresponding receiver locations, wherein the line of position curve comprises a function of a rotational speed of the radar transmitter; and for each signal of interest, determining an estimated target transmitter location based on an intersection of two corresponding line of position curves.

2. The method of claim 1, where computation of the line of position curves includes solving the following equation for each differential scan observation value:

$$t_b - t_a = \frac{1}{\omega}\cos^{-1}\left(\frac{(r_a - r)(r_b - r)}{|r_a - r||r_b - r|}\right),$$

where $t_b-t_a$ is the differential scan observation value computed as the difference between peak power time of arrival values for receivers a and b, $\omega$ is the transmitter scanning frequency in radians per second $r_a$ is a multi-dimensional vector location of receiver a, $r_b$ is a multi-dimensional vector location of receiver b, and r is the line of position curve.

3. The method of claim 2, comprising linearizing the equation about an a priori location estimate and iteratively updating the location estimate so as to minimize a root mean square of the difference between actual and modeled differential scan observations.

4. The method of claim 2, where identifying a peak power time of arrival comprises curve-fitting the received and time stamped signals using a second-order polynomial and identifying a time value corresponding to a maximum value of the fitted curve.

5. The method of claim 2. where the plurality of receivers include three stationary receivers, and where two differential scan observation values are computed for each signal of interest for at least two corresponding pairs of the receivers, where at least two corresponding line of position curves are computed for each signal of interest using the two differential scan observation values, and where an estimated target transmitter location is determined for each signal of interest based on the intersection of the two line of position curves.

6. The method of claim 2, where the plurality of receivers include at least one moving receiver, and where two differential scan observation values are computed for each signal of interest for a pair of receivers that includes the at least one moving receiver, where at least two corresponding line of position curves are computed for each signal of interest using the two differential scan observation values and the corresponding receiver positions, and where an estimated target transmitter location is determined for each signal of interest based on the intersection of the two line of position curves.

7. The method of claim 1, where identifying a peak power time of arrival comprises curve-fitting the received and time stamped signals using a second-order polynomial and identifying a time value corresponding to a maximum value of the fitted curve.

8. The method of claim 1. where the plurality of receivers include three stationary receivers, and where two differential scan observation values are computed for each signal of interest for at least two corresponding pairs of the receivers, where at least two corresponding line of position curves are computed for each signal of interest using the two differential scan observation values, and where an estimated target transmitter location is determined for each signal of interest based on the intersection of the two line of position curves.

9. The method of claim 1, where the plurality of receivers include at least one moving receiver, and where two differential scan observation values are computed for each signal of interest for a pair of receivers that includes the at least one moving receiver, where at least two corresponding line of position curves are computed for each signal of interest using the two differential scan observation values and the corresponding receiver positions, and where an estimated target transmitter location is determined for each signal of interest based on the intersection of the two line of position curves.

10. A system for locating a radar transmitter comprising:
a plurality of receivers operative to receive and time stamping signals from one or more target transmitters; and
a central processing facility coupled with the receivers and comprising a processor and a memory storing differential scan observation values derived from peak power time of arrival data from a pair of the receivers for each signal of interest, the processor being operative for each signal of interest to compute a line of position curve for each differential scan observation value based on the differential scan observation value and corresponding receiver locations, wherein the line of position curve comprises a function of a rotational speed of the radar transmitter, and for each signal of interest to determine an estimated target transmitter location based on an intersection of two corresponding line of position curves.

11. The system of claim 10, where one of the central processing facility and the receivers is operative to each identify a peak power time of arrival value for each signal of interest and each receiver, and where the central processing facility is operative for each signal of interest to merge peak power time of arrival data from multiple receivers.

12. The system of claim 11, where the central processing facility is operative for each signal of interest to compute a differential scan observation value for each pair of receivers with peak power time of arrival data for the signal of interest.

13. The system of claim 12, where the central processing facility is operative to solve the following equation for each differential scan observation value to compute the line of position curves:

$$t_b - t_a = \frac{1}{\omega}\cos^{-1}\left(\frac{(r_a - r)(r_b - r)}{|r_a - r||r_b - r|}\right),$$

where $t_b-t_a$ is the differential scan observation value computed as the difference between peak power time of arrival values for receivers a and b, $\omega$ is the transmitter scanning frequency in radians per second, $r_a$ is a multi-dimensional vector location of receiver a, $r_b$ is a multi-dimensional vector location of receiver b, and r is the line of position curve.

14. The system of claim 11, where the central processing facility is operative to solve the following equation for each differential scan observation value to compute the line of position curves:

$$t_b - t_a = \frac{1}{\omega}\cos^{-1}\left(\frac{(r_a - r)(r_b - r)}{|r_a - r||r_b - r|}\right),$$

where $t_b-t_a$ is the differential scan observation value computed as the difference between peak power time of arrival values for receivers a and b, $\omega$ is the transmitter scanning frequency in radians per second, $r_a$ is a multi-dimensional vector location of receiver a, $r_b$ is a multi-dimensional vector location of receiver b, and r is the line of position curve.

15. The system of claim 10, where the central processing facility is operative to solve the following equation for each differential scan observation value to compute the line of position curves:

$$t_b - t_a = \frac{1}{\omega}\cos^{-1}\left(\frac{(r_a - r)(r_b - r)}{|r_a - r||r_b - r|}\right),$$

where $t_b$–$t_a$ is the differential scan observation value computed as the difference between peak power time of arrival values for receivers a and b, $\omega$ is the transmitter scanning frequency in radians per second, $r_a$ is a multi-dimensional vector location of receiver a, $r_b$ is a multi-dimensional vector location of receiver b, and r is the line of position curve.

16. The system of claim 10, where the central processing facility is operative for each signal of interest to compute a differential scan observation value for each pair of receivers with peak power time of arrival data for the signal of interest.

17. The system of claim 10, where the central processing facility is operative to linearize the equation about an a priori location estimate and iteratively updating the location estimate so as to minimize a root mean square of the difference between actual and modeled differential scan observations.

18. The system of claim 10, where the central processing facility is operative to curve-fit the received and time stamped signals using a second-order polynomial and to identify a time value corresponding to a maximum value of the fitted curve.

19. The system of claim 10, where the plurality of receivers include three stationary receivers, and where two differential scan observation values are computed for each signal of interest for at least two corresponding pairs of the receivers, and where the central processing facility is operative to compute at least two corresponding line of position curves for each signal of interest using the two differential scan observation values, and to determine the estimated target transmitter location for each signal of interest based on the intersection of the two line of position curves.

20. The system of claim 10, where the plurality of receivers include at least one moving receiver, and where two differential scan observation values are computed for each signal of interest for a pair of receivers that includes the at least one moving receiver, and where the central processing facility is operative to compute at least two corresponding line of position curves for each signal of interest using the two differential scan observation values and the corresponding receiver positions, and to determine the estimated target transmitter location for each signal of interest based on the intersection of the two line of position curves.

* * * * *